(12) United States Patent
Becher et al.

(10) Patent No.: US 11,404,870 B2
(45) Date of Patent: Aug. 2, 2022

(54) METHOD FOR PLANNING AN ELECTRICAL POWER TRANSMISSION NETWORK, PLANNING ARRANGEMENT AND COMPUTER PROGRAM PRODUCT

(71) Applicant: SIEMENS AKTIENGESELLSCHAFT, Munich (DE)

(72) Inventors: Silvio Becher, Munich (DE); Dagmar Beyer, Munich (DE); Maximilian Dauer, Zeitlarn (DE); Christian Romeis, Erlangen (DE); Nataliia Ruemmele, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 16/923,294

(22) Filed: Jul. 8, 2020

(65) Prior Publication Data

US 2021/0013716 A1 Jan. 14, 2021

(30) Foreign Application Priority Data

Jul. 8, 2019 (EP) .................................... 19184932

(51) Int. Cl.
*H02J 3/00* (2006.01)
*H04L 41/12* (2022.01)

(52) U.S. Cl.
CPC .............. *H02J 3/003* (2020.01); *H02J 3/004* (2020.01); *H04L 41/12* (2013.01); *H02J 2203/10* (2020.01)

(58) Field of Classification Search
CPC ........ H02J 3/003; H02J 3/004; H02J 2203/10; H02J 3/00; H02J 2203/20; H04L 41/12;
(Continued)

(56) References Cited

U.S. PATENT DOCUMENTS 3,173,996 A * 3/1965 Rypinski, Jr. ......... H04W 84/02
379/381
7,313,759 B2 * 12/2007 Sinisi ..................... G06Q 10/00
715/203
(Continued)

OTHER PUBLICATIONS

Siemens Ingenuity for Life: "PSS SINCAL—All-in-one Simulation Software for Analysis and Planning of Power Networks", published by Siemens AG 2018, Article No. EMDG-B090038-007600-PSSINCAL Brochure.
(Continued)

*Primary Examiner* — Ziaul Karim
(74) *Attorney, Agent, or Firm* — Laurence A. Greenberg; Werner H. Stemer; Ralph E. Locher

(57) ABSTRACT

A method for planning an electrical power transmission network using a planning arrangement includes providing a first input dataset, and converting the first input dataset into graphical representation using a conversion device. The graphical representation contains topology information for interconnection of equipment items and data communication information and parameterization information for equipment items. Different types of equipment are distinguished by a first identifier, electrical connections are distinguished by a second identifier and data communication links are distinguished by a third identifier. Multiply recurring patterns in the graphical representation are identified by a pattern recognition device. A respective frequency of patterns is determined by the pattern recognition device. All patterns having a frequency exceeding a predetermined threshold are marked as candidate samples by the pattern recognition device. Typical configurations are selected from the candidate patterns using a selection criterion. A planning arrangement and a computer program product are also provided.

15 Claims, 4 Drawing Sheets

(58) Field of Classification Search
CPC ............. H04L 41/0803; H04L 41/0836; Y04S 10/50; G06Q 10/06395; G06Q 50/06; G06Q 10/06313
See application file for complete search history.

(56) References Cited

U.S. PATENT DOCUMENTS

| | | | | |
|---|---|---|---|---|
| 2007/0285079 | A1* | 12/2007 | Nasle | G06F 30/20 324/76.22 |
| 2008/0004853 | A1* | 1/2008 | Radibratovic | G05B 17/02 702/181 |
| 2018/0284758 | A1* | 10/2018 | Celia | H04L 1/18 |
| 2019/0324444 | A1* | 10/2019 | Celia | G06N 3/0436 |
| 2019/0339688 | A1* | 11/2019 | Celia | G05B 23/0229 |

OTHER PUBLICATIONS

Siemens Ingenuity for Life: "PSS E—High-performance Transmission Planning and Operations Software for the Power Industry", published by Siemens AG 2017, Article No. EMDG-B090038-007600-PSSE Brochure.

Siemens Ingenuity for Life: "Transmission system planning—Bringing a world of knowledge to your power system" published by Siemens AG 2017.

Ohl W. et al: "Planung von Uebertragungsnetzen als Dienstleistungsangebot", Nachrichtentechnik Elektronik, Veb Verlag Technik, Berlin, DE, vol. 44, No. 5, Sep. 1, 1994 (Sep. 1, 1994), pp. 20-22, XP000494319, ISSN: 0323-4657.

Zhang H. et al: "Research and Development of Integration of Graph, Model and Database Tool in Power Plant RelayProtection Intelligent Setting Calculation System" Mar. 28, 2010 (Mar. 28, 2010), XP055637744, URL:https://ieeexplore.ieee.orgjielx5/5447158/5448125/05448397.pdf?tp=&arnumber=5448397&isnumber=5448125&ref=aHROcHM6Ly9pZWVleHBsb3JlLmllZWUub3JnL2Fic3RyYWNOL2RvY3VtZW5OLzUONDgzOTc= [found on the Internet Oct. 30, 2019].

Cakmak H. et al: "A New Frame work for the Analysis of Large Scale Multi-Rate Power Data", Kit Scientific Working Papers, Jan. 1, 2014 (Jan. 1, 2014), XP055638539, URL:https:ffpdfs.semanticscholar.orgja14f/5d058b7ccf3c982af17b4f6c72351648b673.pdf?ga=2.202789969.1970253465.1572861987-242857557.1559810124 [found on the Internet Nov. 4, 2019].

* cited by examiner

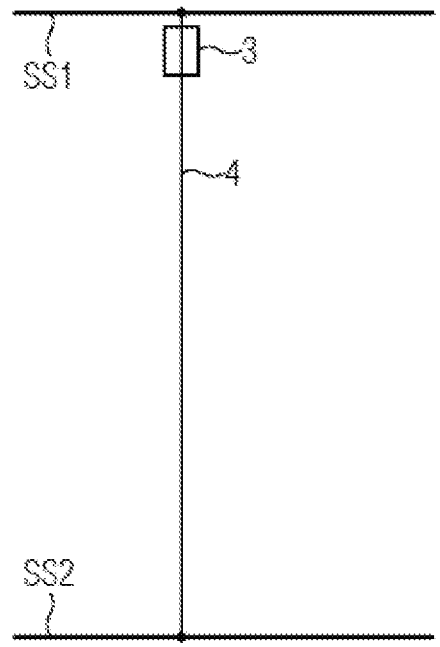
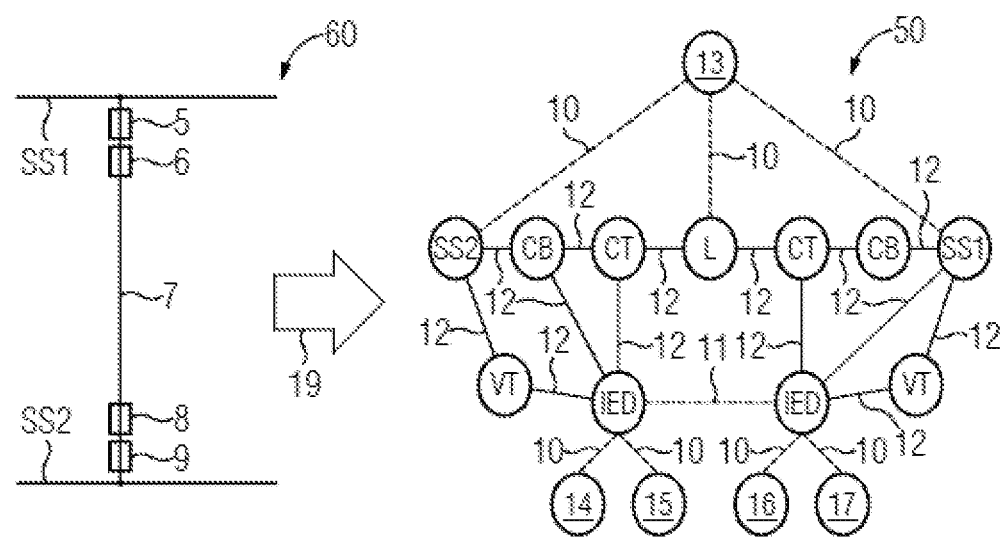

METHOD FOR PLANNING AN ELECTRICAL POWER TRANSMISSION NETWORK, PLANNING ARRANGEMENT AND COMPUTER PROGRAM PRODUCT

CROSS-REFERENCE TO RELATED APPLICATION

This application claims the priority, under 35 U.S.C. § 119, of European Patent Application EP 19184932, filed Jul. 8, 2019; the prior application is herewith incorporated by reference in its entirety.

BACKGROUND OF THE INVENTION

Field of the Invention

The invention relates to a method for planning an electrical energy transmission network by using a planning arrangement, a planning arrangement for planning an electrical energy transmission network and a computer program product stored on a permanent data carrier.

The product brochure "PSS E, High-performance Transmission Planning and Operations Software for the Power industry", Siemens AG 2017, Article number: EMDG-B10125-00-7600-PSSE Brochure, discloses planning software for power transmission networks. In addition, a software application known from the product brochure "PSS SINCAL—All-in-one Simulation Software for the Analysis and Planning of Power Networks", Siemens AG 2018, Article Number: EMDG-B90038-00-7600--PSSSINCAL Brochure, is commonly used. However, due to the complexity of networking a large number of pieces of equipment, planning a power network and implementing the planning in a real network has up to now required many manual steps by network planning experts. A typical procedure is discussed in the flyer "Planning transmission networks—a body of knowledge for your energy installations" published by Siemens AG in 2018.

SUMMARY OF THE INVENTION

It is accordingly an object of the invention to provide a method for planning an electrical power transmission network, a planning arrangement and a computer program product, which overcome the hereinafore-mentioned disadvantages of the heretofore-known methods, arrangements and program products of this general type and with which the planning can be carried out more quickly and with comparatively little effort.

With the foregoing and other objects in view there is provided, in accordance with the invention, a method for planning an electrical power transmission network by using a planning arrangement, which comprises the following steps:
providing a first input dataset,
converting the first input dataset into a graphical representation by using a conversion device, wherein the graphical representation contains topology information for the interconnection of equipment items, and data communication information for the equipment items and parameterization information for the equipment items, wherein
different types of equipment can be distinguished by a first identifier, electrical connections can be distinguished by a second identifier, and data communication links can be distinguished by a third identifier,
identifying patterns that recur more than once in the graphical representation by using a pattern recognition device,
determining the respective frequency of the patterns by using the pattern recognition device,
marking all patterns, the frequency of which exceeds a pre-determined threshold, as candidate samples by using the pattern recognition device, and
selecting typical configurations from the candidate patterns, by taking at least one selection criterion into account.

The invention makes use of the fact that energy networks always have recurring setups or typical configurations in which certain pieces of equipment are interconnected and parameterized in the same way. Until now, such typical configurations have been identified manually, if at all, by an expert and used to plan a power network. For example, an expert recognizes a frequently occurring constellation of equipment and parameterizes a safety device according to their own experience. This may also be supplemented by simulations of the system stability and the behavior of the planned power transmission network in the event of a fault. If a problematic situation is detected, the expert must adjust their network plan manually and carry out a fresh test in the simulation.

Instead of that, the present invention proposes to represent an electrical power transmission network graphically in order to represent the topology, i.e. the interconnection of the pieces of equipment, such as circuit breakers, voltage transformers, current transformers, "intelligent electronic devices," etc. Thus, both primary technology and secondary technology are represented. Parameterization information and communication paths are also stored. This input dataset can be analyzed by using the graphical representation. Items of equipment are represented as nodes; communication paths and electrical connections (and logical associations, if any) are represented as edges.

The different equipment items, or nodes, are represented in such a way that they are distinguishable by a first identifier. For example, the first identifier can indicate the type of equipment, i.e., a circuit breaker, for example. The edges can also be distinguished by further identifiers, so that a communication connection (e.g. an IED—"intelligent electronic device" sends data to another IED) can be distinguished from, e.g., a logical association (an IED has different functions) or from an electrical connection (two hardware items are connected by an electrical conductor, e.g. for medium voltage).

Through the use of the typical configurations found, new power transmission networks can be easily planned by reusing equipment configurations already tried and tested with the typical configurations. This enormously reduces the planning and, if used, simulation effort in network planning. For the first time, this approach enables historical data and/or experience in network planning to be used for new projects in a systematic and automatic way.

A further application involves graphically representing an existing power transmission network and proposing an optimization of the interconnection and/or parameterization of the hardware items in the network and/or then also implementing this optimization in the network. For example, the goal of the optimization can be to maximize the utilization of existing primary technology and at the same time to ensure an n-1 security. An n-1 security level is provided when no total failure of the energy transmission network occurs even in the event of a failure of a single important piece of equipment. Such a method according to the invention can be used directly, for example, in a network control center (for example, a SCADA—"Supervisory Control and Data Acquisition"—system, such as Spectrum Power from Siemens AG). It can also be used advantageously in software tools for automated network planning.

Parameterization information includes, for example, trip thresholds for safety devices, and so-called interlocking rules. Data communication information includes, for example, information relating to data communication, i.e. to which devices communication is to take place with which communication standard, and given which events or in which time cycle. In the case of encrypted communication, corresponding encryption information is also parameterized.

The planning arrangement has a series of devices, such as the conversion device and the pattern recognition device. Like the planning arrangement itself, these devices are implemented as computers or computer components in a computer network, for example. The network can, for example, be the Internet or a local area network (LAN). However, the planning arrangement can also be a cloud application, in which the individual devices are implemented as software modules. A cloud for the purposes of the present invention is a distributed computing and database architecture that deploys data storage and processor resources at different locations through a data network, such as the Internet.

In a preferred embodiment of the method according to the invention a selection device is used to select typical configurations. For example, this can be carried out automatically by a piece of software which uses the selection criterion to select particularly relevant typical configurations for re-use in other planning projects.

In a preferred embodiment of the method according to the invention, the first input dataset contains at least topology information for the interconnection of the equipment, and data communication information on the equipment, and parameterization information on the equipment. This is an advantage because the first input dataset thus reflects the equipment items and their configurations sufficiently accurately in order to enable re-utilization in a new power transmission network to be planned. The first input dataset can preferably be provided from a database of power network configurations or exported from a planning tool, such as the above-mentioned PSS SINCAL. Alternatively, the input dataset can also be created manually, but this requires greater effort.

In a further preferred embodiment of the method according to the invention, a description of an already installed power transmission network is used as the first input dataset. This is an advantage because such energy networks with their configurations are already available in large numbers to operators and planners of power networks. A further advantage obtained is that installed networks have already been tested in practice, i.e. the configurations used have been examined for their practicality in everyday operation.

In a further preferred embodiment of the method according to the invention, a description of already known typical configurations is used, at least in part, as the first input dataset. This is an advantage because by using the known typical configurations, computing effort can be saved during the conversion and the subsequent steps of the method.

In a further preferred embodiment of the method according to the invention, at least one of the following criteria is used as the selection criterion: size of the pattern in terms of the number of equipment items contained, classification into interesting and trivial patterns and/or clusters, ability to be grouped together with other typical configurations. The use of one or more selection criteria has the advantage that trivial configurations or similar irrelevant data can be excluded. Furthermore, the selection criteria can be used to ensure compliance with boundary conditions.

In another preferred embodiment of the method according to the invention, typical configurations determined are used for the simplified planning and commissioning of a power transmission network. This is an advantage, because the power transmission network planned according to the invention can then be implemented in reality with comparatively little effort.

In a further preferred embodiment of the method according to the invention, as part of the simplified planning, a second input dataset relating to a power transmission network to be planned is provided, and on the basis of the selected typical configurations a second graphical representation of the power transmission network to be planned is determined, which contains topology information for the interconnection of equipment and data communication information for the equipment and parameterization information for the equipment, different types of equipment being distinguishable by a first identifier, and electrical connections being distinguishable by a second identifier and data communication connections being distinguishable by a third identifier, and the second graphical representation is converted into an output dataset.

In a further embodiment of the method according to the invention, user preferences are taken into account. This is an advantage because customer wishes and technical constraints can be even better satisfied.

In a further preferred embodiment of the method according to the invention, the user preferences include at least one of the following preferences:

typical configurations created manually by a user, a list and/or ranking of typical configurations.

In particular, a ranking of typical configurations makes it possible to use only certain configurations, or certain configurations with a higher position in the ranking, more often than other configurations, for planning purposes.

In another preferred embodiment of the method according to the invention, the output dataset is examined to determine whether the topology information, data communication information and parameterization information are suitable for configuring the power transmission network to be planned. This involves, for example, a simulation of the planned power transmission network or the output dataset. For example, it can be examined whether a specified voltage band or a specified rated voltage etc. can be maintained during normal operation.

In a further embodiment of the method according to the invention, in the event that no suitable output dataset is identified, a new output dataset is determined taking into account a restrictive constraint. The constraint reduces the search space for suitable configurations, making it easier to find a solution automatically.

In a further preferred embodiment of the method according to the invention, in the event that multiple output datasets are identified, these output datasets are ranked based on the user preferences, so that the output dataset that best corresponds to the user preferences is selected. This is an advantage because it selects a solution that best meets the customer's expectations.

In a further preferred embodiment of the method according to the invention, in the event that no output dataset is identified that configures the entire power transmission network to be planned, a partial solution for the output dataset is provided. This is an advantage because at least a portion of the power transmission network to be planned can be planned automatically.

On the basis of known planning arrangements, the object of the invention is to specify a planning arrangement with which the planning of an electrical power transmission network is carried out faster and with comparatively little effort.

With the objects of the invention in view, there is also provided a planning arrangement for planning an electrical power transmission network, comprising:
- a conversion device which is configured to convert a first input dataset into a graphical representation that contains topology information for the interconnection of equipment items and data communication information on the equipment items and parameterization information on the equipment items, wherein different types of equipment can be distinguished by a first identifier, electrical connections can be distinguished by a second identifier, and data communication links can be distinguished by a third identification,
- a pattern recognition device that is configured:
- to identify patterns that recur more than once in the graphical representation,
- to determine the respective frequency of the patterns, and
- to mark all patterns, the frequency of which exceeds a pre-determined threshold, as candidate samples, and
- a selection device which is configured to select typical configurations from the candidate patterns, taking at least one selection criterion into account.

In accordance with another embodiment of the invention, an electrical power transmission network can be put into operation more simply with the typical configurations determined. The same advantages as those described above for the method according to the invention apply mutatis mutandis.

On the basis of known planning arrangements, the object of the invention is to specify a computer program product with which the planning of an electrical power transmission network can be carried out faster and with comparatively little effort.

With the objects of the invention in view, there is concomitantly provided a non-transitory computer program product which is stored on a permanent data carrier and is configured to perform the steps of a method according to the invention when the computer program product is executed on a planning arrangement. The same advantages as those described above for the method according to the invention apply mutatis mutandis.

Other features which are considered as characteristic for the invention are set forth in the appended claims.

Although the invention is illustrated and described herein as embodied in a method for planning an electrical power transmission network, a planning arrangement and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagram showing an example of an input dataset;

FIG. 2 is a diagram showing a first exemplary embodiment of the conversion of an input dataset into a graphical representation;

DETAILED DESCRIPTION OF THE INVENTION

Figure 3:
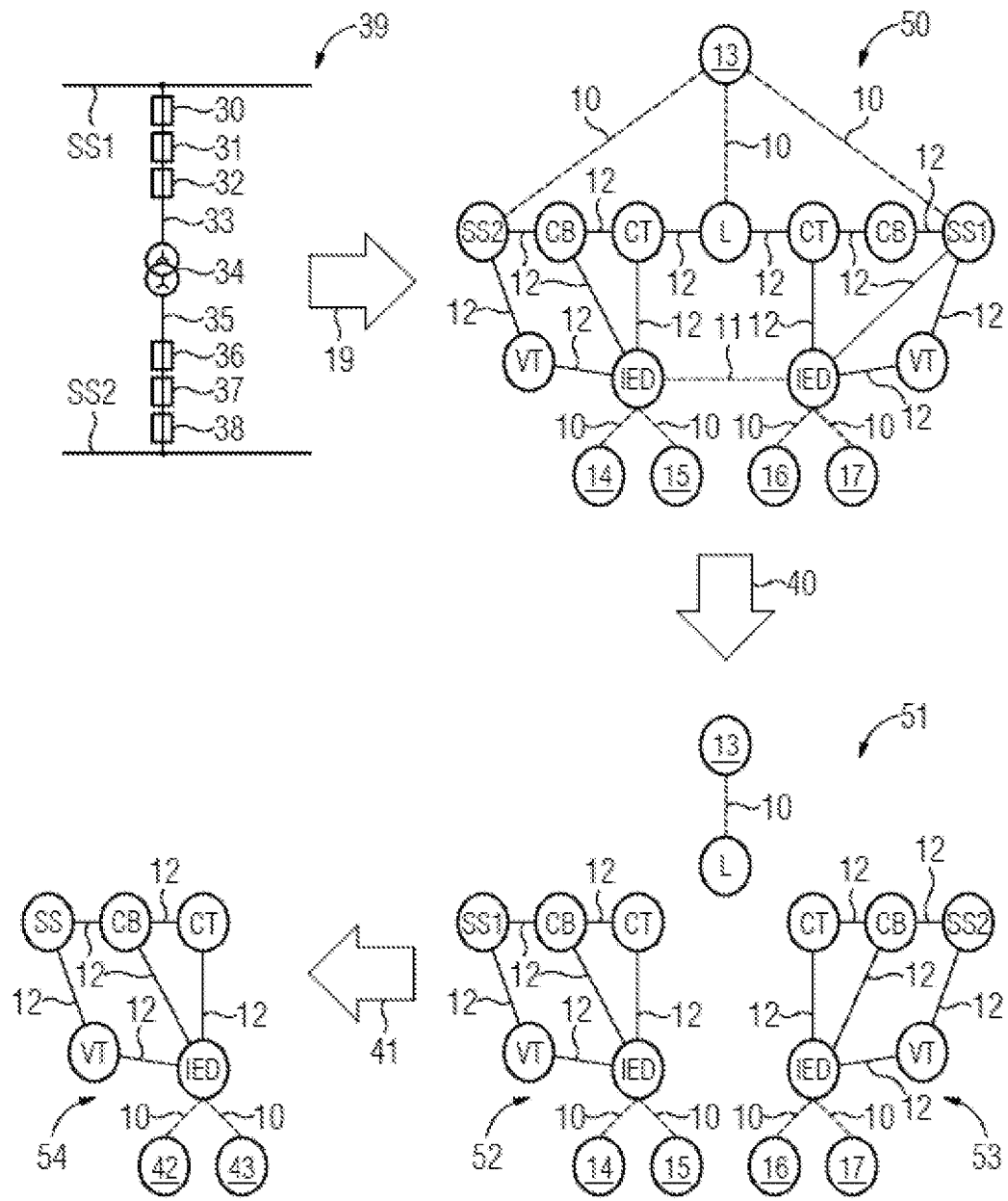
FIG. 3 is a diagram showing a second exemplary embodiment of an automatic identification of typical configurations based on a sample network.

Referring now to the figures of the drawings in detail and first, particularly, to FIG. 1 thereof, there is seen an example of an input dataset. Two busbars SS1, SS2 of an electrical power distribution network are represented as a so-called "single-line diagram," i.e. (assuming symmetrically loaded phases) as a single phase representing all three phases. The busbars SS1, SS2 are connected by a transmission line 4. A terminal 3 is provided on the line 4, which has a circuit breaker (not shown), a current transformer and a safety device.

The following information is also stored in the input dataset:

Primary Technology

| Topology | |
|---|---|
| Voltage level | 20 kV |
| Frequency | 50 Hz |
| Infeed | single-sided |
| Star point treatment | deleted |

| Quantity table | |
|---|---|
| Circuit breakers | 1 |
| Current transformers | 1 |
| Voltage transformers | 0 |
| Transmission lines | 1 |

Busbars

| SS1 | |
|---|---|
| Rated voltage | 24 kV |
| Grid level | 20 kV |
| Rated short-time withstand AC voltages | 50/60 kV |
| Rated withstand lightning surge voltages | 125/145 kV |
| Rated operating current | 630 A |
| Rated short-time current | 20 kA |
| Rated surge current | 50 kA |

| SS2 | |
|---|---|
| Rated voltage | 24 kV |
| Grid level | 20 kV |
| Rated short-time withstand AC voltages | 50/60 kV |
| Rated withstand lightning surge voltages | 125/145 kV |
| Rated operating current | 630 A |
| Rated short-time current | 20 kA |
| Rated surge current | 50 kA |
| Voltage levels | 20 kV |
| Grid level | 20 kV |

Cable Data for Line 4

| Type | NA2YSY |
|---|---|
| Length | 1 km |
| Parallel systems | 1.0 |
| Resistance | 0.3 Ohms/km |
| Reactance | 0.2 Ohms/km |
| Capacitance | 235.0 nF/km |

Current Transformer Data Terminal 1

| Transformer current | 3 ph |
|---|---|
| Transformer ratio | 300/1 A |
| Class | 5P |
| Nominal overcurrent figure | 20 |
| Nominal impedance | 2.5 VA |

Secondary Technology

| Terminal 1 Assignment of primary technology | |
|---|---|
| Circuit breaker | Terminal 1 line |
| Current transformer | Terminal 1 line |

| 50/51 | |
|---|---|
| I>> | 2.0 A |
| t>> | 0.5 s |
| I> | 1.5 A |
| t> | 0.9 s |

This detailed information allows a description of the actual implementation of the sample network in abstract form.

FIG. 2 shows a first exemplary embodiment of a conversion 19 of an input dataset 60 into a graphical representation 50. The input dataset 60 in the example is shown in a simplified and schematic form, namely as two busbars SS1, SS2, connected by a transmission line 7. This representation corresponds in turn to a so-called "Single Line" diagram, which represents a power transmission network in simplified form with only one phase. For the transmission line 7, detailed parameterization information is stored in a similar way to the example in FIG. 1. In the example, the line 7 has a length of 1 km, a resistance of 0.3 Ohms/km, a reactance of 0.2 Ohms/km, and a capacitance of 235 nF/km.

Each busbar SS1, SS2 is assigned two safety terminals or safety devices 5, 6, 8, 9. Similarly, as in the example in FIG. 2, copious additional information is stored relating to the safety devices, the items of equipment installed which are connected to the safety devices, etc. This type of representation of the input dataset 60 can be exported from the "PSS SINCAL" software mentioned above, for example.

This is followed by a step for converting the input dataset 60 into the graphical representation 50. In the conversion step 19 the data in the input dataset is analyzed to detect logical associations 10, electrical connections 12, and data communication links 11. In addition, the SS1, SS2 busbars, the line L and the additional connected items of equipment—circuit breaker (CB), IED (intelligent electronic device), voltage transformer (VT) and current transformer (CT)—are identified in the input dataset 60. In the example shown, it is also specified that two functions associated with each of the IEDs can be detected, which are labeled in the drawing with the reference signs 14 to 17. For example, these are interlocking rules or the like governing the operation of the IED in relation to its safety device function. The voltage level of the power transmission system, which amounts to 20 kV, for example, is ranked logically higher than the busbars SS1, SS2. Further examples of functions 14 to 17 assigned to the IEDs are, for example, a distance safety function or a power differential safety function.

FIG. 3 shows a second exemplary embodiment of an automatic identification of typical configurations based on a sample network. A new example of a power transmission network with two busbars SS1, SS2, connected by a transmission line 33, 35 and a transformer 34, is used as the input dataset 39. In the example, a series of other equipment items 30, 31, 33, 36, 37, 38 are interconnected. As in the examples above, the input dataset 39 contains further information on the interconnection of the equipment or on the topology, the data communication between equipment items and on the parameterization of the individual equipment items 30, 31, 32, 35, 37, 38. The input dataset 39 is converted into a graphical representation 50 in a first step 19. This corresponds to the simplified understanding of the graphical representation according to FIG. 2. In a next step 40, the graphical representation 50 is processed so as to recognize patterns in the graphical representation. In particular, patterns that occur more than once are identified. In the example shown, the graphical representation 50 can be divided into three patterns, namely that the line L is logically associated with the medium-voltage network 13, and two candidate patterns 52, 53 which each separately have the equipment items assigned to the respective busbars SS1, SS2. In a further step 41, the patterns are analyzed in such a manner that both patterns can be described as a single pattern 54 that has the equipment assigned to the respective busbar. In other words, the system automatically recognizes that the two candidate patterns 52, 53 are mirror symmetrical and differ only in that a different busbar is provided. Accordingly, it can be automatically detected that a typical configuration 54 is included twice in the graphical representation 50. In the example shown, even a simple one-off occurrence as the respective frequency of the patterns can be specified as the threshold for providing a candidate pattern. Similarly, even the singly occurring element 51 (the line is assigned to the 20 kV network) is recognized as a candidate pattern. For example, a multiple occurrence of the pattern in the graphical representation 50 is a suitable selection criterion for identifying the pattern 54 that is ultimately identified as a typical configuration.

In summary, a plurality of process steps is described in FIG. 3, namely conversion 19 of the input dataset 39 into a graphical representation 50, furthermore identification 40 of patterns occurring more than once in the graphical representation, and determining the respective frequency of the patterns. The patterns 51, 52, 53, the respective frequency of which exceeds a pre-determined threshold (in this case zero), are recognized as candidate patterns. In the final step 41, typical configurations 54 are selected from the candidate patterns 51, 52, 53 taking into account at least one selection criterion (multiple occurrences of the candidate pattern in the graphical representation 50).

The patterns within the graphical representation 50 are detected based on a functional dependency between items of equipment, or on the basis of a small number of connections within a cluster or a pattern. In other words, the equipment items that are combined into a pattern in the first instance are those which have many connections to each other (logical, electrical or through communication) and only few connections to other nodes in the graph. Further possible selection criteria can also be a filtering by size (number of nodes and edges), a filtering of isomorphic candidate patterns (in graph theory, the isomorphism of graphs is the property whereby two graphs are structurally the same), or a differentiation into trivial and complex patterns.

Figure 4:
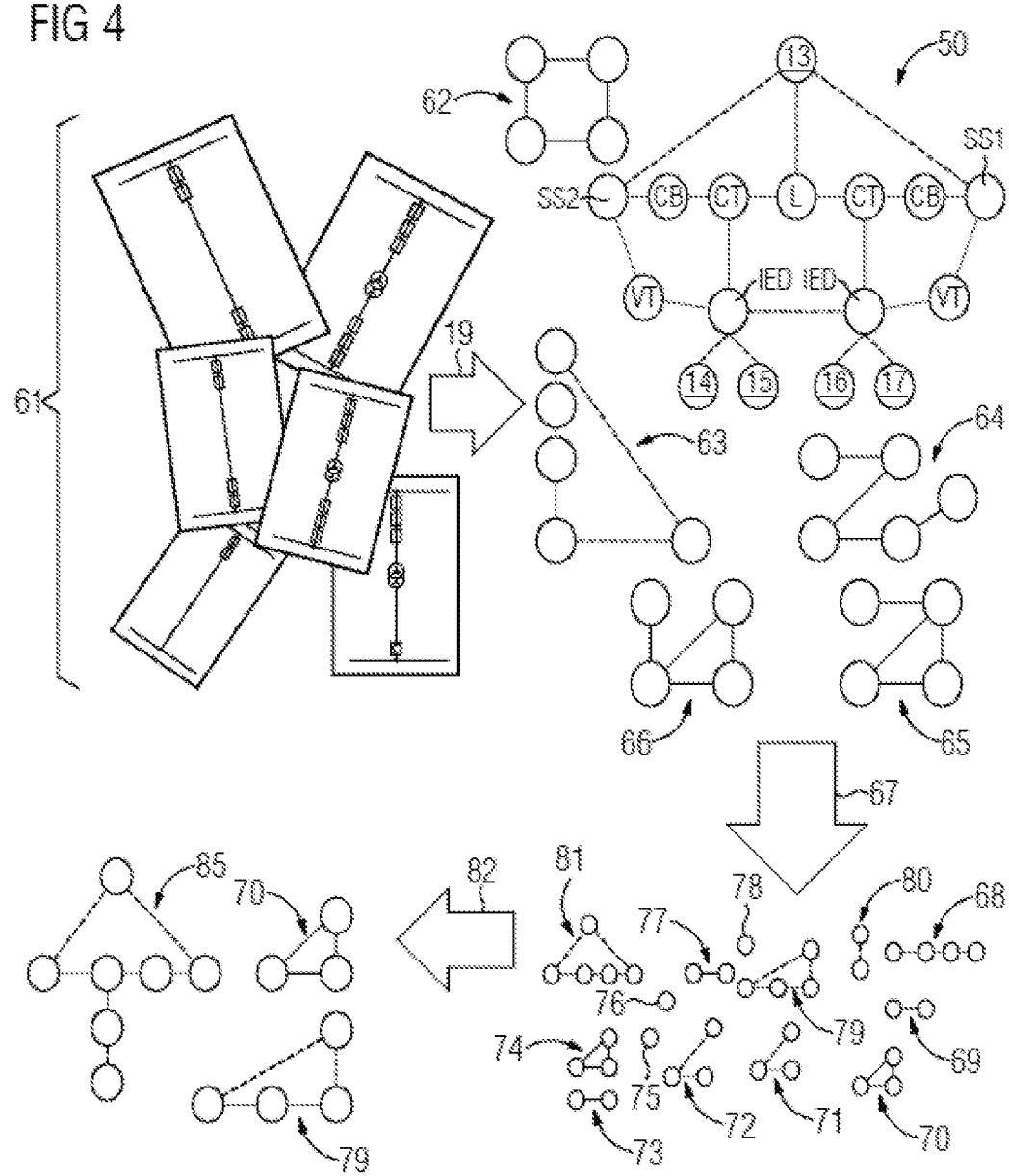
FIG. 4 is a diagram showing a third exemplary embodiment of an automatic identification of typical configurations based on a plurality of sample networks.

FIG. 4 shows a third exemplary embodiment of an automatic identification of typical configurations based on a sample network. By converting 19 a plurality of different input datasets or descriptions of power transmission networks 61 into graphical representations 50, 62, 63, 64, 65, 66, a collection of different graphical representations is created. This diverse collection of graphical representations can also be used in a step 67 to identify patterns that occur more than once. A series of different candidate patterns 68-80 is produced, which can then be used as a basis for selecting typical configurations 85, 70, 79, again by using a selection step 82. Based on the selection criteria used in this case, for example a combination of frequency and complexity, the three typical configurations 70, 79, 85 are identified. The typical configurations 70, 79 have already been recognized as candidate patterns in the previous step. The pattern 85 was formed by combination in a further processing step as part of the selection 82 from the candidate patterns 81 and 80. Such a combination of candidate patterns to form new typical configurations is particularly advantageous in order to provide a particularly large library of typical configurations for network planning.

In FIG. 4 it should also be noted that for better comprehension the labels of the edges and also some of the labeling of the nodes have been omitted.

Figure 5:
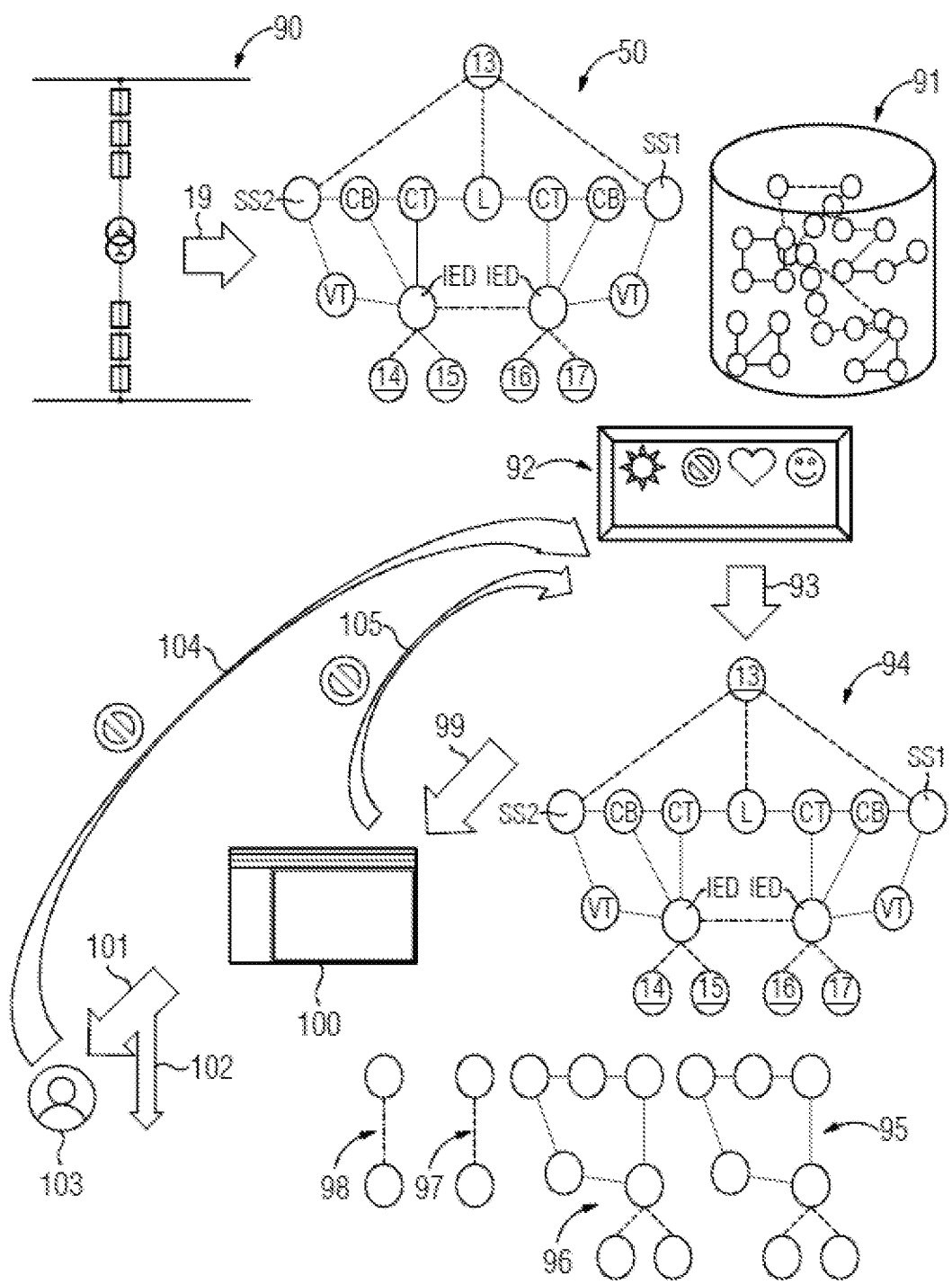
FIG. 5 is a diagram showing a fourth exemplary embodiment of an automatic optimization of a sample network.

FIG. 5 shows a fourth exemplary embodiment of an automatic optimization of a sample network.

A first input dataset 90 is converted into a graphical representation 50 in a step 19. In addition, a database 91 is available, containing numerous typical configurations that have been previously automatically identified or manually specified. In addition, a set of user preferences 92 (represented by the different symbols sun, prohibition, heart, smiley face) is provided in another database. The user preferences can, for example, be a preference for typical configurations, in particular those configurations that have been manually created by a user, or a list or ranking of typical configurations. In particular, the automatic selection of typical configurations can be influenced by a ranking or a list of which configurations are preferred by the user.

The aim of the method according to FIG. 5 is to create a second graphical representation 94 in a step 93, based on the known typical configurations 91 and the user preferences 92. This representation 94 is assembled from the existing known typical configurations 95, 96, 97, 98 (shown simplified) from the database 91. Because it uses known and already tried and tested typical configurations 95, 96, 97, 98, the new graphical representation 94 has an optimized interconnection, parameterization and configuration of communication connections and hence, e.g., a higher stability than the original power transmission network according to the input dataset 90.

In order to examine whether the solution found for the second graphical representation 94 actually satisfies the requirements and is optimized compared to the input dataset 90, a conversion of the second graphical representation 94 into an output dataset is performed in step 99. The output dataset is evaluated using simulation software 100, which performs load-flow and grid stability calculations, for example. Safety aspects and short-circuit simulations can also be carried out. If the output dataset was recognized in this way with the simulation software 100 as being optimized and ready for use, the method is terminated, for example at this point.

However, if the simulation reveals problems, such as a sub-optimal short-circuit behavior or problems in the load flow, then the solution according to the output dataset or the second graphical representation 94 is rejected and the procedure is returned to step 93. In order to then achieve a different and possibly improved result compared to the first attempt in step 93, the user preferences can be changed, either automatically or by the user. An automated change can be formed of choosing the next entry in a ranking of preferred typical configurations, thereby developing a slightly modified second graphical representation 94.

The output dataset can be optionally further processed again in a step 101, after the examination using the simulation software 100. To do so, a manual evaluation is performed by a user and, if appropriate, in a step 102 the output dataset is provided for implementation in a power transmission network. However, the user 103 can also discard the original dataset and in a step 104, by changing the preferences 92 again, perform a new optimization attempt using step 93 by creating a new graphical representation 94.

The method shown herein according to FIG. 5 thus differs from the previous exemplary embodiments shown in that an existing power transmission network based on the input dataset 90 can also be optimized during operation, e.g. by using the output dataset to provide a safety configuration which is optimized in terms of availability and reliability.

The invention claimed is:

1. A method for planning an electrical power transmission network by using a planning arrangement, the method comprising the following steps:

providing a first input dataset;

converting the first input dataset into a graphical representation by using a conversion device, the graphical representation containing topology information for an interconnection of equipment items, data communication information for the equipment items and parameterization information for the equipment items;

distinguishing different types of equipment by using a first identifier;

distinguishing electrical connections by using a second identifier;

distinguishing data communication links by using a third identifier;

identifying patterns recurring more than once in the graphical representation by using a pattern recognition device;

determining a respective frequency of the patterns by using the pattern recognition device;

marking all patterns having a frequency exceeding a pre-determined threshold, as candidate samples by using the pattern recognition device;

selecting typical configurations of frequently occurring constellations of equipment interconnected and parameterized in the same way from the candidate patterns, by taking at least one selection criterion into account; and planning the power transmission network using the typical configurations selected.

2. The method according to claim 1, which further comprises providing the first input dataset with at least:
topology information for interconnection of the equipment items;
data communication information for the equipment items; and
parameterization information for the equipment items.

3. The method according to claim 1, which further comprises using a description of a previously installed energy transmission network as the first input dataset.

4. The method according to claim 1, which further comprises using a description of previously known typical configurations, at least in part, for the first input dataset.

5. The method according to claim 1, which further comprises using at least one following criteria as a selection criterion: size of the pattern in terms of a number of equipment items contained, classification into at least one of interesting and trivial patterns or clusters, or ability to be grouped together with other typical configurations.

6. An electrical power transmission network planned by a method using known typical configurations of frequently occurring constellations of equipment interconnected and parameterized in the same way to simplify the planning and commissioning of a power transmission network, the method comprising the steps of:
providing a second input dataset relating to a power transmission network to be planned;
on a basis of selected typical configurations, determining a second graphical representation of the power transmission network to be planned containing topology information on an interconnection of equipment items, data communication information on the equipment items and parameterization information on the equipment items;
distinguishing different types of equipment by using a first identifier;
distinguishing electrical connections by using a second identifier;
distinguishing data communication links by using a third identifier;
converting the second graphical representation into an output dataset; and
planning the power transmission network using the output dataset.

7. The method according to claim 6, which further comprises taking user preferences into account.

8. The electrical power transmission network according to claim 7, wherein the method further comprises including in the user preferences at least one following preference:
typical configurations created manually by a user, or
at least one of a list or ranking of typical configurations.

9. The electrical power transmission network according to claim 6, wherein the method further comprises examining the output dataset to determine suitability of the topology information, data communication information and parameterization information for configuring the power transmission network to be planned.

10. The electrical power transmission network according to claim 9, wherein the method further comprises upon no suitable output dataset being identified, determining a new output dataset taking a restrictive constraint into account.

11. The electrical power transmission network according to claim 9, wherein the method further comprises upon multiple output datasets being identified, ranking the output datasets based on user preferences for selecting the output dataset best corresponding to the user preferences.

12. The electrical power transmission network according to claim 6, wherein the method further comprises upon no output dataset being identified that entirely configures the power transmission network to be planned, providing a partial solution for the output dataset.

13. A planning arrangement for planning an electrical power transmission network, the planning arrangement comprising:
a conversion device configured to convert a first input dataset into a graphical representation containing topology information for an interconnection of equipment items, data communication information on said equipment items and parameterization information on said equipment items;
a first identifier for distinguishing different types of equipment;
a second identifier for distinguishing electrical connections;
a third identification for distinguishing data communication links;
a pattern recognition device configured:
to identify patterns recurring more than once in said graphical representation,
to determine a respective frequency of the patterns, and
to mark all patterns having a frequency exceeding a pre-determined threshold as candidate samples;
a selection device configured to select typical configurations of frequently occurring constellations of equipment interconnected and parameterized in the same way from said candidate patterns by taking at least one selection criterion into account and
a data processor configured to plan the power transmission network using the typical configurations selected.

14. The planning arrangement according to claim 13, wherein said determined typical configurations permit the electrical power transmission network to be put into operation more simply.

15. A non-transitory computer program product stored on a permanent data carrier and configured to perform, when the computer program product is executed on a planning arrangement, the steps of:
providing a first input dataset;
converting the first input dataset into a graphical representation by using a conversion device, the graphical representation containing topology information for an interconnection of equipment items, data communication information for the equipment items and parameterization information for the equipment items;
distinguishing different types of equipment by using a first identifier;
distinguishing electrical connections by using a second identifier;
distinguishing data communication links by using a third identifier;
identifying patterns recurring more than once in the graphical representation by using a pattern recognition device;
determining a respective frequency of the patterns by using the pattern recognition device;

marking all patterns having a frequency exceeding a pre-determined threshold, as candidate samples by using the pattern recognition device;

selecting typical configurations of frequently occurring constellations of equipment interconnected and parameterized in the same way from the candidate patterns, by taking at least one selection criterion into account; and planning the power transmission network using the typical configurations selected.

* * * * *